United States Patent
DeWitt, Jr. et al.

(10) Patent No.: US 7,458,078 B2
(45) Date of Patent: Nov. 25, 2008

(54) APPARATUS AND METHOD FOR AUTONOMIC HARDWARE ASSISTED THREAD STACK TRACKING

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 897 days.

(21) Appl. No.: 10/703,658

(22) Filed: Nov. 6, 2003

(65) Prior Publication Data

US 2005/0102673 A1 May 12, 2005

(51) Int. Cl.
*G06F 9/46* (2006.01)
*G06F 11/00* (2006.01)
*G06F 9/00* (2006.01)
(52) U.S. Cl. ............ 718/104; 718/100; 718/105; 714/30; 714/37; 714/39; 714/45; 714/47; 712/225; 712/226; 712/227
(58) Field of Classification Search ............ 718/1–108; 712/227, 202, 225, 226, 244; 714/30, 35, 714/37, 38, 39, 45, 47
See application file for complete search history.

(56) References Cited

U.S. PATENT DOCUMENTS

| | | | |
|---|---|---|---|
| 4,291,371 A | 9/1981 | Holtey | 364/200 |
| 4,598,364 A * | 7/1986 | Gum et al. | 714/38 |
| 5,103,394 A | 4/1992 | Blasciak | 395/575 |
| 5,438,670 A * | 8/1995 | Baror et al. | 711/3 |

(Continued)

FOREIGN PATENT DOCUMENTS

JP 2000029731 12/1999

(Continued)

OTHER PUBLICATIONS

"Whole-Program Optimization, for Time and Space Efficient Threads"; Dirk Grunwald, Richard Neves; 1996 ACM Publication.*

(Continued)

*Primary Examiner*—Thomas Lee
*Assistant Examiner*—Abdullah Al Kawsar
(74) *Attorney, Agent, or Firm*—Duke W. Yee; Herman Rodriguez; Gerald H. Glanzman (57) ABSTRACT

Method and apparatus for tracking thread stacks during a trace of a computer program. Hardware assistance mechanisms allow a processor to autonomically maintain a thread work area for each thread where a call stack is stored. An operating system informs the processor of the size of the data area to allocate to a particular thread work area. When a trace of a computer program is to be performed, trace software, informs the processor to begin maintaining thread call stack information in the thread work area. For each thread in the computer program execution, the processor maintains a work area having a size that is determined based on the size communicated by the operating system. The processor contains microcode to cause the processor to automatically store thread tracking information in the work areas designated by control registers of the processor when a control bit is set.

13 Claims, 5 Drawing Sheets

U.S. PATENT DOCUMENTS

| | | | | |
|---|---|---|---|---|
| 5,691,920 | A | 11/1997 | Levine et al. | 364/551.01 |
| 5,774,724 | A | 6/1998 | Heisch | 395/704 |
| 5,913,925 | A * | 6/1999 | Kahle et al. | 712/206 |
| 5,930,508 | A | 7/1999 | Faraboschi et al. | 395/706 |
| 5,937,437 | A | 8/1999 | Roth et al. | 711/202 |
| 5,938,778 | A | 8/1999 | John, Jr. et al. | 714/45 |
| 5,966,537 | A | 10/1999 | Ravichandran | 395/709 |
| 5,987,250 | A | 11/1999 | Subrahmanyam | 395/704 |
| 6,070,009 | A | 5/2000 | Dean et al. | 395/704 |
| 6,098,169 | A * | 8/2000 | Ranganathan | 712/227 |
| 6,101,524 | A | 8/2000 | Choi et al. | 709/102 |
| 6,105,051 | A | 8/2000 | Borkenhagen et al. | |
| 6,134,676 | A | 10/2000 | VanHuben et al. | 714/39 |
| 6,189,141 | B1 | 2/2001 | Benitez et al. | 717/4 |
| 6,192,513 | B1 | 2/2001 | Subrahmanyam | 717/5 |
| 6,206,584 | B1 | 3/2001 | Hastings | 395/183.11 |
| 6,223,338 | B1 | 4/2001 | Smolders | 717/4 |
| 6,237,019 | B1 * | 5/2001 | Ault et al. | 718/104 |
| 6,243,804 | B1 | 6/2001 | Cheng | 712/228 |
| 6,256,775 | B1 * | 7/2001 | Flynn | 717/127 |
| 6,286,132 | B1 | 9/2001 | Tanaka et al. | 717/4 |
| 6,324,689 | B1 | 11/2001 | Lowney et al. | 717/9 |
| 6,330,662 | B1 | 12/2001 | Patel et al. | 712/236 |
| 6,351,844 | B1 | 2/2002 | Bala | 717/4 |
| 6,374,364 | B1 | 4/2002 | McElroy et al. | 714/10 |
| 6,430,741 | B1 | 8/2002 | Mattson, Jr. et al. | 717/154 |
| 6,442,585 | B1 | 8/2002 | Dean et al. | 709/108 |
| 6,446,029 | B1 | 9/2002 | Davidson et al. | 702/186 |
| 6,480,938 | B2 | 11/2002 | Vondran, Jr. | 711/125 |
| 6,549,930 | B1 * | 4/2003 | Chrysos et al. | 718/104 |
| 6,654,781 | B1 | 11/2003 | Browning | |
| 6,658,416 | B1 | 12/2003 | Hussain et al. | |
| 6,687,811 | B1 * | 2/2004 | Yamada | 712/227 |
| 6,951,018 | B2 * | 9/2005 | Long et al. | 718/100 |
| 6,988,186 | B2 | 1/2006 | Eickemeyer et al. | |
| 7,024,668 | B2 * | 4/2006 | Shiomi et al. | 718/1 |
| 7,207,043 | B2 * | 4/2007 | Blythe et al. | 718/104 |
| 7,237,242 | B2 * | 6/2007 | Blythe et al. | 718/105 |
| 2001/0014905 | A1 * | 8/2001 | Onodera | 709/102 |
| 2001/0032305 | A1 | 10/2001 | Barry | 712/34 |
| 2002/0010733 | A1 | 1/2002 | Baba et al. | |
| 2002/0019976 | A1 | 2/2002 | Patel et al. | 717/137 |
| 2002/0124237 | A1 | 9/2002 | Sprunt et al. | 717/127 |
| 2002/0129309 | A1 | 9/2002 | Floyd et al. | 714/724 |
| 2002/0147965 | A1 | 10/2002 | Swaine et al. | 717/124 |
| 2002/0199179 | A1 | 12/2002 | Lavery et al. | 717/158 |
| 2004/0216104 | A1 | 10/2004 | Fluhr et al. | |
| 2004/0216105 | A1 | 10/2004 | Burky et al. | |
| 2004/0268317 | A1 * | 12/2004 | Gouriou et al. | 717/130 |

FOREIGN PATENT DOCUMENTS

| | | |
|---|---|---|
| JP | 2000347863 | 12/2000 |

OTHER PUBLICATIONS

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Super Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, Feb. 20-22, 2000, pp. 516-524.

IBM Research Disclosure Bulletin 444188, "Enable Debuggers as an Objective Performanc Measurement Tool for Software Development Cost Reduction", Apr. 2001, pp. 686-688.

U.S. Appl. No. 09/435,069, Davidson et al., Method and Apparatus for Instruction Sampling for Performance Monitoring and Debug, filed Nov. 4, 1999.

U.S. Appl. No. 08/538,071, Gover et al., Method and System for Selecting and Distinguishing an Event Sequence using an Effective Address in a Proc ssing Syst m, filed Oct. 2, 1995.

* cited by examiner

APPARATUS AND METHOD FOR AUTONOMIC HARDWARE ASSISTED THREAD STACK TRACKING

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining performance data regarding thread stacks.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded during the intervals. These values may be resolved against a load map and symbol table information for the data processing system at post-processing time, and a profile of where the time is being spent may be obtained from this analysis.

Creating tools such as these to find answers related to specific situations or problems can take much effort and can be very difficult to calibrate as the software tools themselves affect the system under test. The present invention recognizes that hardware assistance for tool development and problem analysis can significantly ease the amount of effort needed to develop software performance tools. Further, with the increasing density of processors, hardware assistance can be included to provide additional debug and analysis features.

Therefore, it would be advantageous to have an improved method, apparatus, and computer instructions for providing hardware assistance for performance tools to analyzing the performance of data processing systems.

SUMMARY OF THE INVENTION

The present invention provides a method and apparatus for providing an autonomic mechanism for tracking thread stacks during a trace of a computer program. The present invention includes hardware assistance mechanisms that allow the processor to autonomically maintain a work area for each thread where a call stack is stored.

With the present invention, when a trace of a computer program is to be performed, the trace software, i.e. a performance monitoring application, informs the processor of the computer system to begin maintaining thread call stack information in a thread work area. This may be done, for example, by setting a control bit in a control bit register of the processor to indicate thread tracking to be performed.

An operating system or a part of a tracing application which is a kernel extension or a device driver of an operating system; hereafter referred to as simply an operation system of the computing device, allocates data areas for use as thread work areas for storing the thread call stack information. For each thread in the computer program execution, the processor maintains a work area having a size that is determined and allocated based on the size communicated by the kernel extension operating system. The work area is designated by address and length information stored in control registers of the processor. Thus, a first control register stores a beginning memory address for a beginning of the thread work area of a thread, a second control register stores a length or size of the work area, and a third control register indicating the top of the stack.

The size of the work areas for the threads may be increased on an as needed basis, as instructed by the operating system, by extending the thread work area and resetting the length in the control register for the thread. When a thread work area is about to be exceeded by the amount of thread tracking information being stored in the thread work area, the processor may send an interrupt to the operating system to extend the thread work area. The operating system may then allocate a larger range of memory addresses to store the thread tracking information, reset the memory address and length stored in the control registers, and copy the already stored thread tracking information to the new thread work area.

The processor contains microcode that is used to cause the processor to automatically store thread tracking information in the work areas designated by the control registers of the processor when the control bit is set. As the processor executes a call instruction, information regarding the method/routine called is automatically stored in the appropriate thread work area, i.e. the method/routine information is pushed onto the call stack, indicating entry to a particular method/routine. When the processor executes a return instruction, the processor automatically removes the method/ routing information from the call stack in the thread work area, i.e. pops the method/routine call stack entry off of the call stack by adjusting the control register pointing to the top of the stack.

In an alternative embodiment, however, rather than popping the method/routine entry off the call stack, entries on the call stack may indicate either entry or exit of the method/ routine. In such an alternative embodiment, entries to the call stack are added whether or not the entry is added because of an entry to the method/routine or an exit from the method/ routine with the individual entries indicating whether they are associated with an entry or an exit.

In this way, the thread work areas contain hardware generated thread tracking information that may be used by a software application to obtain trace data for use in analyzing the execution of a computer program. For example, a trace application may periodically "wake up" and obtain a snapshot of trace data by looking at the thread work areas to obtain information about the current status of the execution of the computer program. The trace application may look at all of the current thread work areas, the work areas for only the currently executing threads, the work areas for the threads that are in a suspended state, or the like.

The present invention takes advantage of the fact that the processor knows when it is entering and exiting methods/ routines by virtue of the instructions that are being executed by the processor. Thus, rather than having a software program monitor the execution of a computer program to determine when methods/routines are entered/exited and writing the information to a software maintained call stack, the present invention enables the processor hardware to autonomically write the necessary information to a thread work area. In this way, the maintaining of a thread stack is performed independently of the software tracing algorithms. As a result, changes in the software for tracking the execution of a computer program will not affect the mechanisms used to maintain the thread call stack.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a hardware assistance mechanism for maintaining thread tracking information automatically and independently of the tracing algorithms used to trace the execution of a computer program. The present invention may be implemented in a stand-alone computing device or in a network based computing device. For example, the present invention may be implemented in a personal computer, a network computer, a server, or the like. Thus, the following diagrams in FIGS. 1-2B are intended to provide a context for the operations described hereafter.

Figure 1:
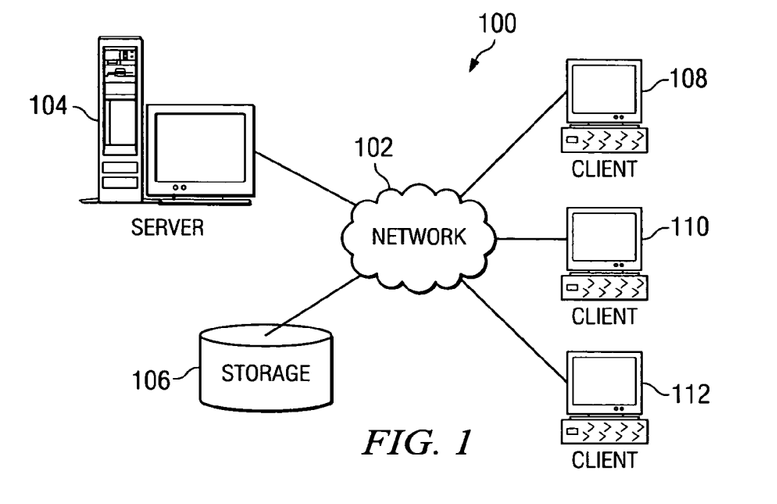
FIG. 1 is an exemplary pictorial representation of a distributed data processing system in which the present invention may be implemented.
Figure 2A:
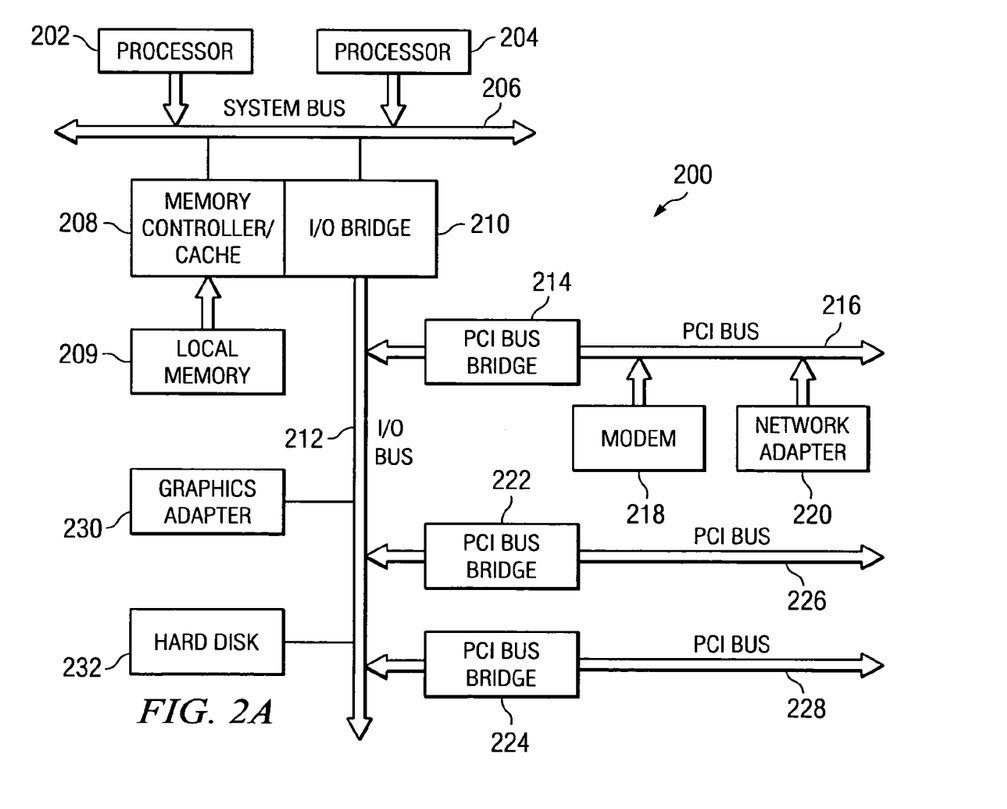
FIG. 2A is an exemplary block diagram of a server data processing system in which aspects of the present invention may be implemented.
Figure 2B:
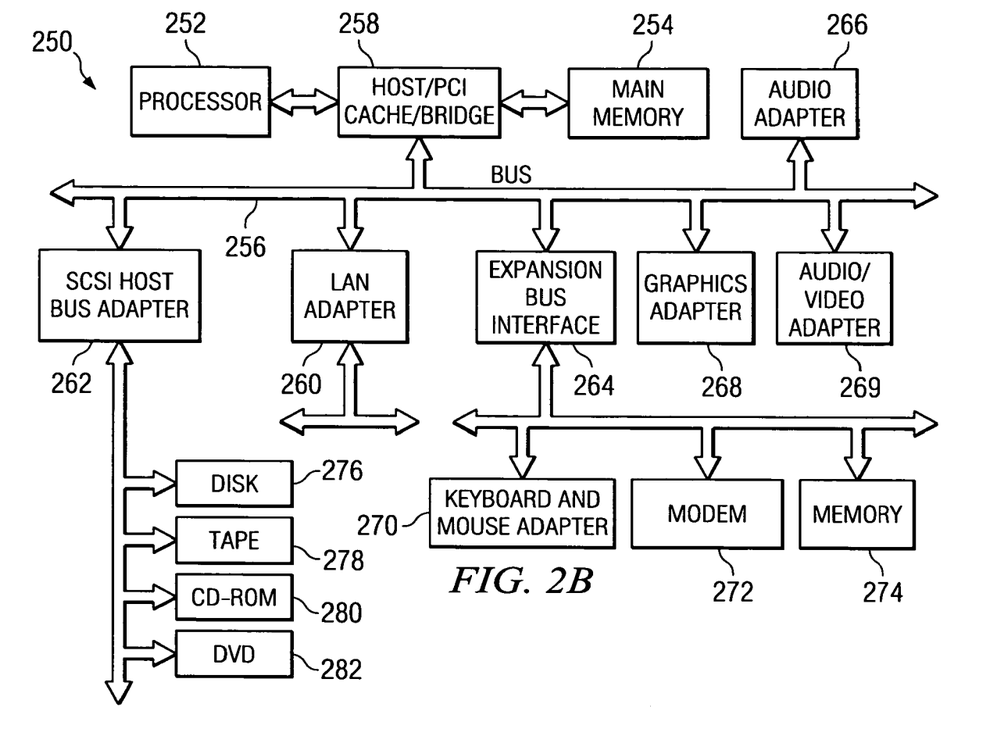
FIG. 2B is an exemplary block diagram of a stand-alone or client data processing system in which aspects of the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

With reference now to FIG. 2B, a block diagram of a data processing system in which the present invention may be implemented is illustrated. Data processing system 250 may be a stand alone computing device or may be an example of a client computer, such as that shown in FIG. 1. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines, Inc. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a method and apparatus for hardware generated thread tracking information to be stored automatically, i.e. without requiring trace software application intervention to instruct the storing of the thread tracking information, for later use by trace applications and post processor applications. In one exemplary embodiment, the operating system allocates a work area for thread tracking information. The size of the work area may be provided from a trace application. The trace application may be present on the same computing device as the processor or may be remotely located from the computing device on which the processor, which is to automatically generate the thread tracking information, is resident.

The hardware assistance mechanism of the present invention is to be used to maintain information that is to be used by a trace application or post processing application for obtaining performance information for the trace of the execution of a computer program. Therefore, a brief overview of trace applications and post processing applications will be provided.

Figure 3:
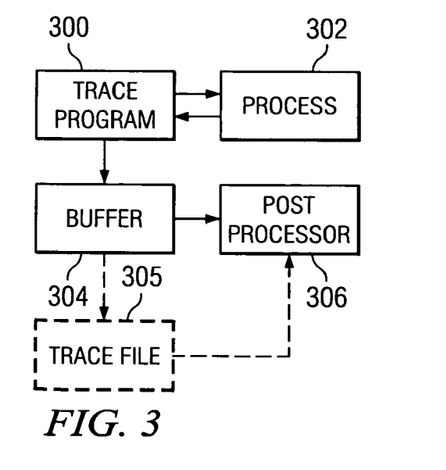
FIG. 3 is an exemplary block diagram that depicts components used to perform performance traces of processes in a data processing system.

With reference now to FIG. 3, a block diagram depicts components used to perform performance traces of processes in a data processing system. A trace program 300 is used to profile processes 302. Trace program 300 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 300, which stores the trace data in buffer 304. The trace data in buffer 304 may be subsequently stored in a file for post-processing, or the trace data may be processed in real-time. The trace data in either the buffer 304 or the trace file, is then processed by the post-processor 306 to generate an indexed database of symbolic data for loaded modules, as described more fully hereafter.

In a non-Java environment, trace hooks may be employed that aid in the identification of modules that are used in an application under trace. With Java operating systems, trace hooks may be employed that aid in identifying loaded classes and methods.

In addition, since classes and modules may be loaded and unloaded, these changes may also be identified using trace data. This is especially relevant with "network client" data processing systems, such as those that may operate under Java OS, since classes and jitted methods may be loaded and unloaded more frequently due to the constrained memory and role as a network client. Note that class or module load and unload information is also relevant in embedded application environments, which tend to be memory constrained.

Figure 4:
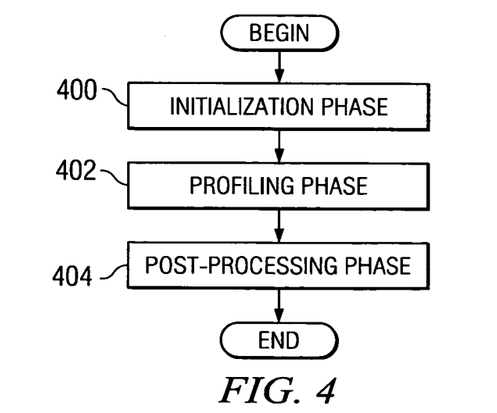
FIG. 4 is an exemplary diagram that depicts various phases in performing a performance trace of the workload running on a system.

With reference now to FIG. 4, a diagram depicts various phases in performing a performance trace of the workload running on a system. Subject to memory constraints, the generated trace output may be as long and as detailed as the analyst requires for the purpose of profiling a particular program.

An initialization phase 400 is used to capture the state of the client machine at the time tracing is initiated. This trace initialization data includes trace records that identify all existing threads, all loaded classes (modules), and all methods (sections) for the loaded classes (modules). Records from trace data captured from hooks are written to indicate thread switches, interrupts, and loading and unloading of classes (modules) and "jitted" methods (sections).

Any class (module) which is loaded has trace records that indicate the name of the class (module) and its methods (sections). In the depicted example, four byte IDs are used as identifiers for threads, classes, and methods. These IDs are associated with names that have been output in the trace records. A trace record is written to indicate when all of the start up information has been written.

Next, during the profiling phase 402, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following operations may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed, for example.

In the post-processing phase 404, the data collected in the trace buffer is processed or sent to a trace file for post-processing. In one configuration, the file may be sent to a server, which determines the profile for the processes on the client machine. Of course, depending on available resources, the post-processing also may be performed on the client machine.

With the present invention, rather than having to use hooks to write thread tracking information to a trace buffer, the present invention uses hardware assistance to automatically detect when a computer program execution enters and exits a method/routine and write thread tracking information to a designated thread work area. Thus, the present invention eliminates the need to instrument the executing computer program to ensure that thread tracking information is stored for later processing. Furthermore, the present invention operates independently of the trace application once initiated. Thus, the present invention may be utilized with a plurality of different trace applications.

Figure 5:
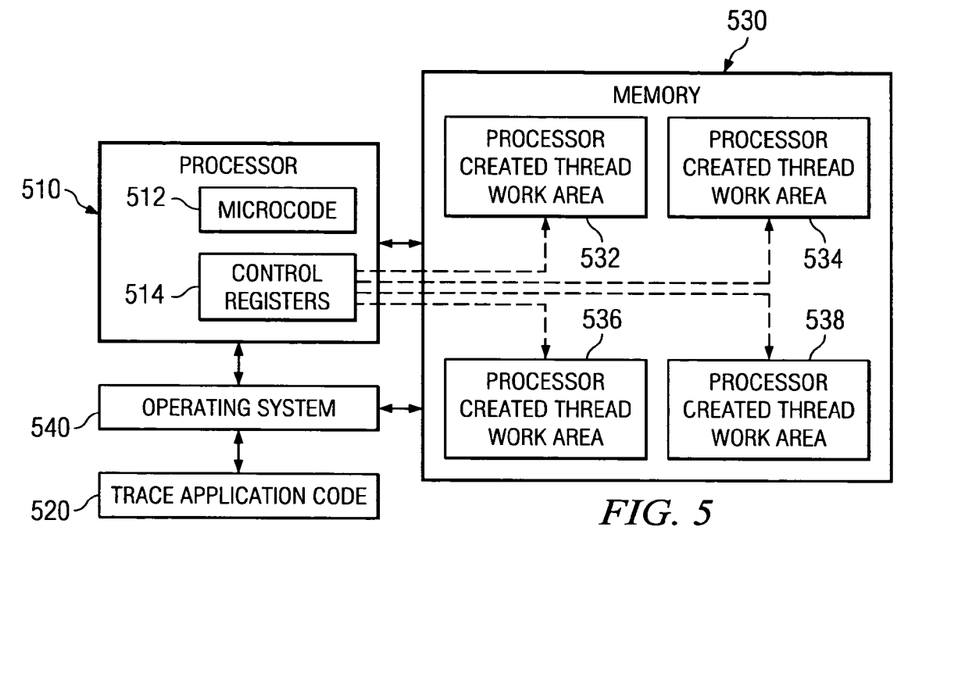
FIG. 5 is a diagram illustrating the primary operational components according to one exemplary embodiment of the present invention.

With reference now to FIG. 5, a diagram illustrating the primary operational components according to one exemplary embodiment of the present invention is illustrated. With the present invention, during the initialization phase of a performance tracing program, such as the initialization phase 402 in FIG. 4, the trace program code 520 may instruct the operating system 540 regarding the size of the work area that is to be allocated for threads of the computer program and may set a control bit in the processor 510 to indicate that hardware thread tracking is to be performed. The operating system 540 may then allocate a portion of the system memory 530 for use as the work areas for thread tracking information. The beginning address and length for the work areas may then be stored in control registers 514 of the processor 510.

The operating system 540 may, as threads are initiated during execution of the computer program, allocate work areas 532-538, one for each existing thread in the computer program, in which the thread's call stack information is to be stored. The beginning address and length for each portion of memory may be stored in respective control registers 514 of the processor 510. In addition, a control register may be used to identify the last work area to which an entry is written. In this way, the currently active thread work area may be identified. The value in this control register may be updated with each context switch. Thus, the present invention may make use of a plurality of work areas, one for each existing thread, to maintain thread tracking information.

The microcode 512 is programmed with instructions for establishing work areas and monitoring the execution of instructions to determine how to update the thread tracking information in the work areas. The microcode 512 is a permanent memory that holds the elementary circuit operations a computer must perform for each instruction in its instruction set. The microcode 512 acts as a translation layer between the instruction and the electronic level of the computer. The present invention enhances known microcode to include the additional functionality and operations discussed herein.

Thus, for each existing thread, the operating system 540 allocates a portion of memory 530 for use in storing one or more work areas. This portion of memory 530 has a size equal to the size communicated to the operating system 540 by the trace application code 520. The microcode 512 then begins to monitor the instructions executed by the processor 510 to determine if a new thread is spawned, if a memory overflow occurs, if a method/routine entry instruction is executed, and if a method/routine exit instruction is executed.

If a new thread is spawned, then a new work area in the system memory 530 may be created and a context switch may be communicated to the microcode 512 so that the value in the register identifying the last work area accessed may be updated. If a memory overflow occurs, then the work area for the associated thread may be extended. If a method/routine entry instruction is executed, then a call stack entry for the method/routine is created in the appropriate work area indicating the entry of a method/routine, i.e. a call stack entry is pushed onto the call stack. If a method/routine exit instruction is executed, then a call stack entry for the method/routine is removed from the appropriate work area indicating the exiting of a method/routine, i.e. the call stack entry corresponding to the method/routine is popped off the stack. Alternatively, a call stack entry for the exiting of the method/routine may be entered into the call stack of the work area rather than popping off the method/routine from the call stack. Each of these operations will be described hereafter.

If a new thread is spawned during the execution of the computer program that is being traced, and thread tracking is enabled in the processor 510 by the setting of the control bit in the processor 510, then a new work area is needed in order to track the thread execution. A new thread may be determined to have been spawned by the communication of a context switch by the operating system 540. Similar to the allocation of work areas during initialization, the operating system 540 may allocate a new work area for the new thread by setting control registers 514 to point to the beginning of the work area and designate the length of the work area in the system memory 530. Thereafter, when the new thread causes an event to occur, such as entry or exit of a method/routine, an entry will be written to the work area or removed from the work area for the new thread having the necessary information for use by the trace application/post processor.

If a method/routine entry instruction is executed by the processor 510, as determined by whether the instruction executed by the processor 510 is a "call" instruction or not, the microcode 512 determines if thread tracking is enabled in the processor 510. That is, the microcode 512 determines if the control bit identifying thread tracking to be enabled is set. If the control bit is set and a method/routine entry instruction is executed by the processor 510, the microcode 512 determines that a call stack event has occurred that requires the creation and storage of a call stack entry in the work area for the associated thread.

The microcode 512 identifies the beginning address of the work area for the thread by retrieving the address information from the control registers 514 and determines if there is enough room in the work area to write the call stack entry for the event. This may be determined by comparing the length of the work area, as designated in the control registers 514, to the location of the last entry written to the call stack in the work area. If the work area has enough remaining storage, a call stack entry for the event is generated and stored in the work area for the thread, e.g., thread work area 532. This call stack entry may include, for example, the address of the method/routine being called.

If the work area for the thread, e.g., work area 532, does not have sufficient storage capacity for a new call stack entry, then the microcode 512 identifies the condition as a work area or memory overflow. As a result, the microcode 512 sends an interrupt to the trace application code 520 via the operating system 540 indicating the work area overflow. In response, the trace application code 520 may instruct the operating system 540 to extend the work area for the thread by a certain amount of memory space.

In response to the instruction to extend the work area for the thread, the operating system 540 may allocate a new range of memory address for the work area that is larger than the previous range. The control registers 514 may then be set to point to the beginning of this new range of memory addresses. The new size of the range of memory addresses may then be designated and the call stack entry information in the previous work area may then be copied over to the new work area.

Similar to the operation above with regard to the entry of a method/routine, the processor 510 may detect that a method/routine is exited by the execution of a "return" instruction in the code of the computer program. When a "return" instruction is executed, the processor 510 may first determine whether the control bit for hardware assisted thread tracking is set. If so, the processor 510 may adjust the value of a register that points to the end of the stack and pop off an entry at the end of the call stack corresponding to the method/routine that is being exited. The value of the control register indicating the current thread work area may first be retrieved to determine which work area to search for the corresponding method/routine call stack entry. Thereafter, the method/routine call stack entry may then be popped off the call stack.

Alternatively, as discussed above, rather than popping off entries in the call stack for the method/routine upon the detection of a "return" instruction, the present invention may add an additional entry designating the exit of the method/routine. In this way, rather than removing entries for methods/routines that are exited, the call stack maintains information about every method/routine entered and exited during execution of the thread.

Thus, as the processor 510 executes instructions of the computer program under the trace, the operating system 540 automatically allocates new work areas for newly spawned threads, writes call stack entries into thread work areas in response to the detection of an entry/exit method/routine event, and extends work areas as needed. As a result, hardware mechanisms of the present invention help to alleviate some of the burden of performing these operations entirely in software. Moreover, since the hardware may operate virtually independently of the trace application and computer program under trace, with regard to these operations, these operations may be performed regardless of the particular trace application or computer program that is executing. Furthermore, the computer program under trace need not be instrumented to obtain the call stack information since this information is automatically obtained by the processor once the trace application indicates that thread tracking is to be enabled.

It should be appreciated that the above operations of the present invention may be initiated at any time during tracing of a computer program. Thus, a situation may be present in which the mechanism of the present invention is initiated while method calls are currently outstanding, i.e. a method call has been made and the present invention is initiated prior to the called method being exited. When in call stack mode, a return operation may be performed without a call operation having been made while the present invention is active. In these situations, such return operations are handled as a no op.

Figure 6:
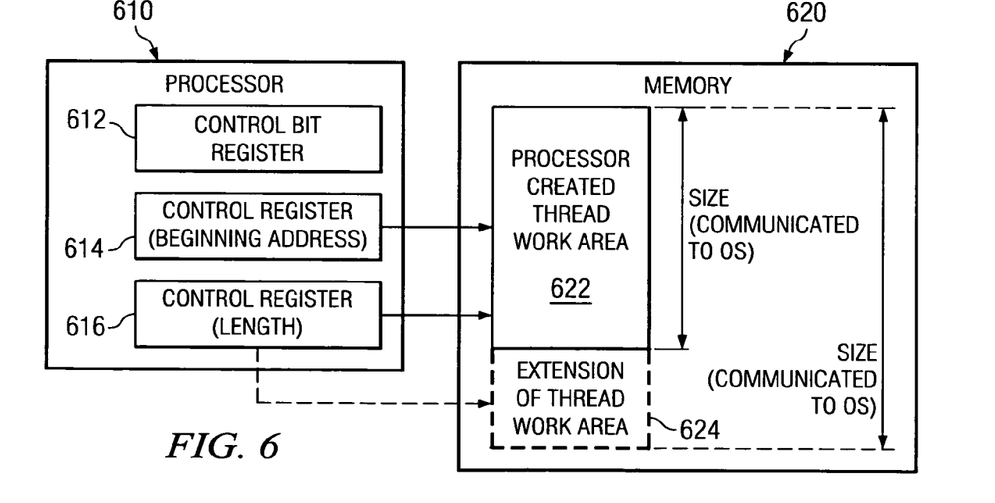
FIG. 6 is a diagram illustrating the use of control registers in the processor in accordance with an exemplary embodiment of the present invention.

FIG. 6 is a diagram illustrating the use of control registers in the processor in accordance with an exemplary embodiment of the present invention. As shown in FIG. 6, the processor 610 includes a control bit register 612, a control register 614, and a control register 616. Memory 620, which may be system memory, for example, includes a thread work area 622 that is allocated by the operating system. This thread work area may be extended when writing an entry to the thread work area 622 would exceed the range of addresses allocated to the work area 622. The extending of the work area 622 is depicted as the extension 624, although the extension may result in a completely different set of addresses being allocated for the work area comprised of elements 622 and 624.

As shown in FIG. 6, the control bit register 612 is used to identify when thread tracking is enabled in the processor 610. That is, when the trace application initializes tracing of a computer program, the trace application may set the control bit register 612 to indicate to the microcode of the processor 610 that it should begin tracking thread execution automatically.

As a result, the operating system allocates a work area 622 in the memory 620. This work area 622 comprises a range of memory addresses to which call stack entries are to be written. The microcode of the processor 610 sets control registers 614 and 616 to point to the beginning address and length of the work area 622. Thus, if a plurality of threads are spawned by the computer program under trace and a work area is to be used for each existing thread, a plurality of sets of control registers 614 and 616 will be used to store the beginning addresses and lengths of the plurality of work areas 622 in the memory 620.

When a thread of execution involves the processor 610 executing an instruction requiring the creation and storage of a call stack entry in the work area 622 of the thread, the microcode of the processor 610 identifies the work area 622 based on the addresses stored in the control registers 614 and 616 and attempts to write the entry to the work area 622. If the writing of the entry cannot be accomplished because there is not enough storage space in the allocated work area 622, i.e. the write is an attempt to write to an address that is larger or outside the address range associated with the length stored in control register 616, then the microcode of the processor 610 identifies a memory or work area overflow and may send an interrupt to the trace application.

In response to receiving this interrupt, an interrupt handler associated with the trace application may instruct the operating system to extend the work area for the thread. In response to the instruction to extend the work area, the operating system may reallocate the work area 622 to include the extension area 624. Such reallocation may result in a completely different range of addresses for the work area or may include the original range of addresses plus the addition set of address for the extension 624. In either case, the control registers 614 and 616 are updated to point to the appropriate beginning address and length for the work area comprising elements 622 and 624. In this way, the operating system may dynamically extend work areas for thread tracking during the trace of the computer program.

As mentioned previously, the microcode of the processor continues to automatically write call stack entries to the respective work areas of the memory until the trace of the computer program is complete or until instructed to discontinue thread tracking by resetting of the thread tracking control bit. The information stored in the work areas may be used by the trace application and/or a post-processor to make performance evaluations of the computer program under trace.

For example, a trace application may periodically "wake up" and obtain a snapshot of trace data by looking at the thread work areas to obtain information about the current status of the execution of the computer program. The trace application may look at all of the current thread work areas, the work areas for only the currently executing thread, the work areas for the threads that are in a suspended state, or the like.

In one exemplary embodiment, the trace application may periodically wakeup, e.g., every 10 milliseconds, and copy the contents of the work areas for certain threads of interest to the trace buffer. This will provide a snapshot of the execution of the computer program. These snapshots may then be analyzed by the post-processor to determine performance metrics for the execution of the computer program.

Figure 7:
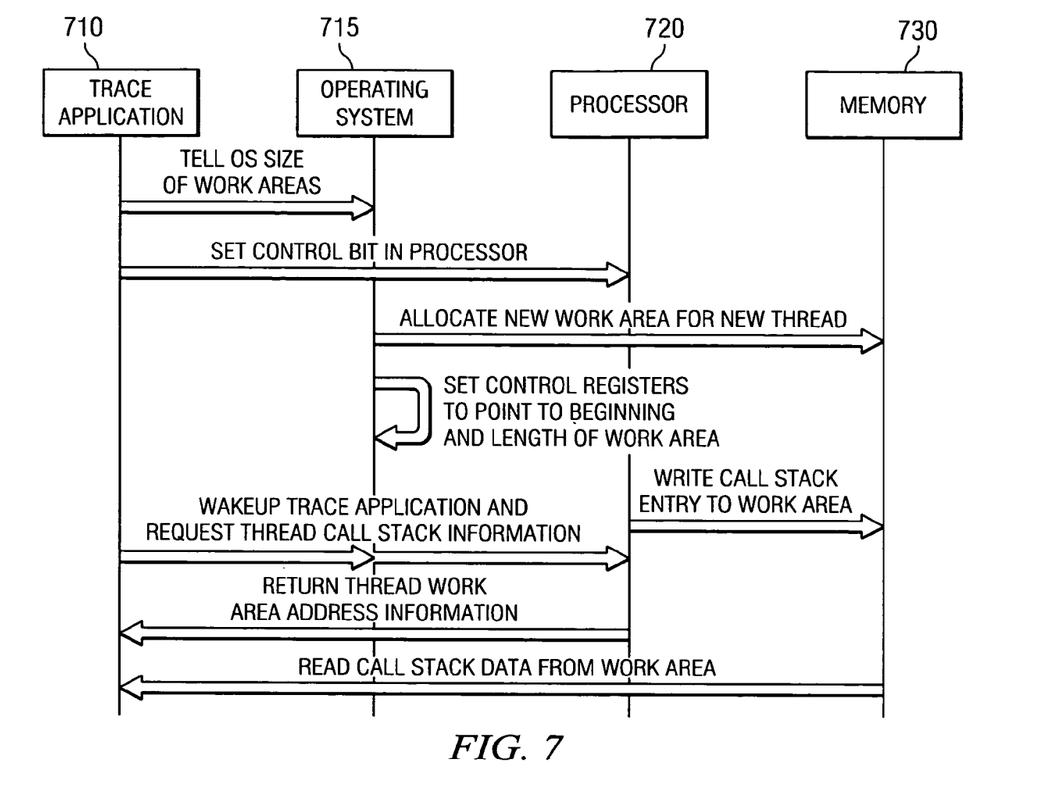
FIG. 7 is a diagram illustrating a data flow according to one exemplary embodiment of the present invention.

FIG. 7 is a diagram illustrating a data flow according to one exemplary embodiment of the present invention. As shown in FIG. 7, the operation starts with the trace application 710 informing the operating system 715 of the size of the work areas for storing of thread tracking information, e.g., call stack information, and instructing the processor 720 to set the thread tracking enabled control bit in the control bit register. The size information may be stored in a register for later use when allocating new work areas for spawned threads.

The operating system 715 then allocates the new work areas for the existing threads of the computer program by allocating address ranges in memory 730 for each thread. The processor 720 then sets the control registers to point to the beginning addresses and store the length for each work area. Thereafter, as call stack events occur, the processor 720 call stack entries are written to the appropriate work areas in the memory 730.

At some time later, a wakeup of the trace application 710 may occur and the trace application may request the thread call stack information from the processor 720. The processor 720 may then return the thread work area address information to the trace application 710. The trace application 710 may then retrieve the call stack information for threads of interest from the memory 730 via the operating system 715. The retrieved call stack information for the threads of interest may then be processed by the trace application 710 or stored in a data structure for analyzing by a post processing program.

Figure 8:
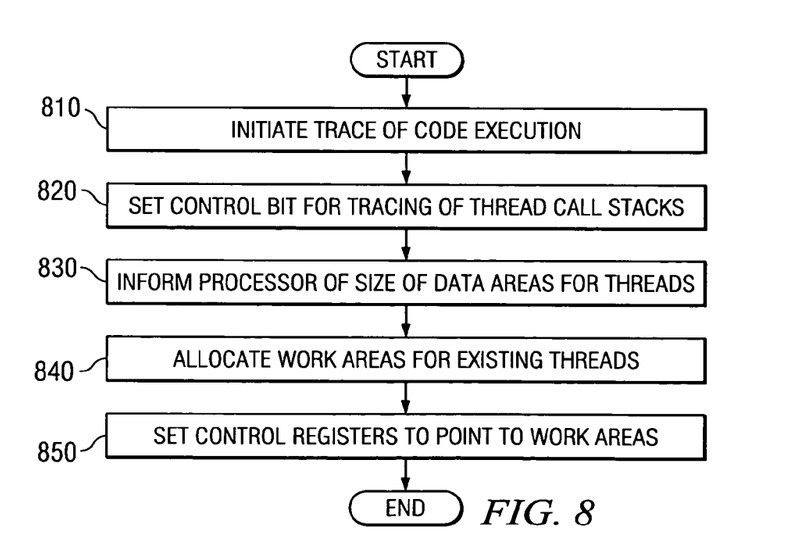
FIG. 8 is a flowchart outlining an exemplary operation for initiating hardware thread tracking in accordance with an exemplary embodiment of the present invention.
Figure 9:
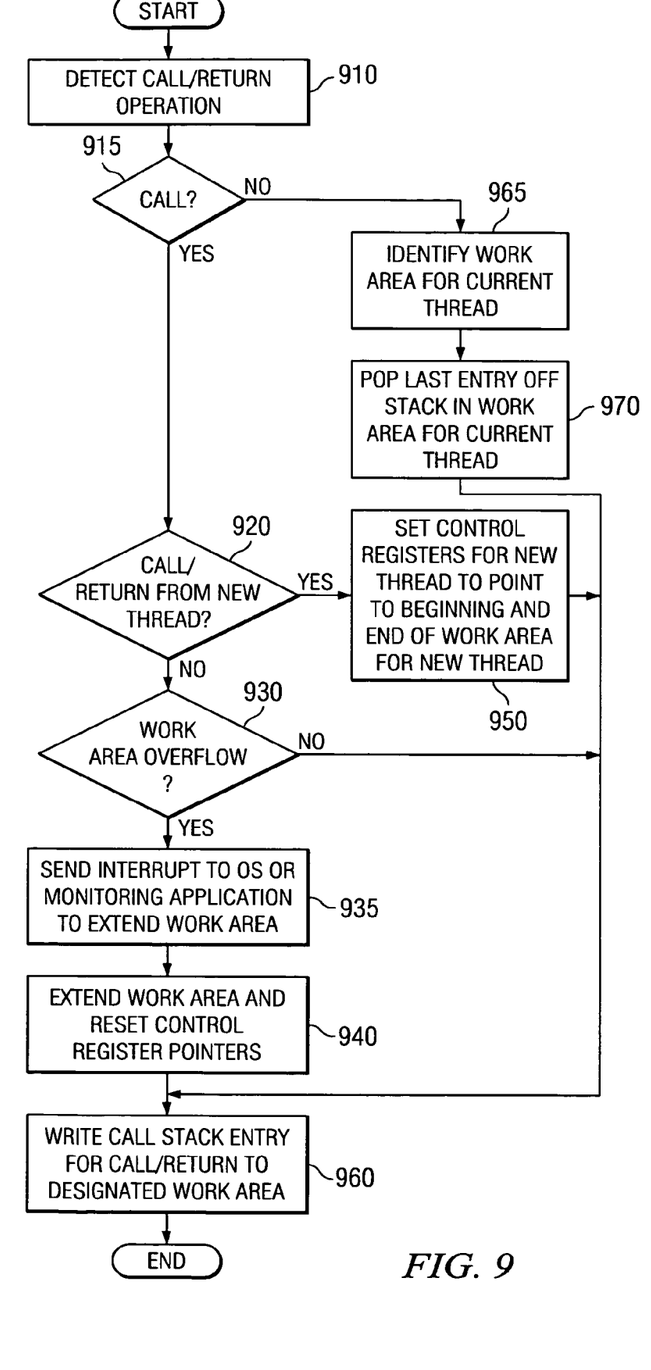
FIG. 9 is a flowchart outlining an exemplary operation for writing thread tracking information to a thread work area in accordance with an exemplary embodiment of the present invention.
Figure 10:
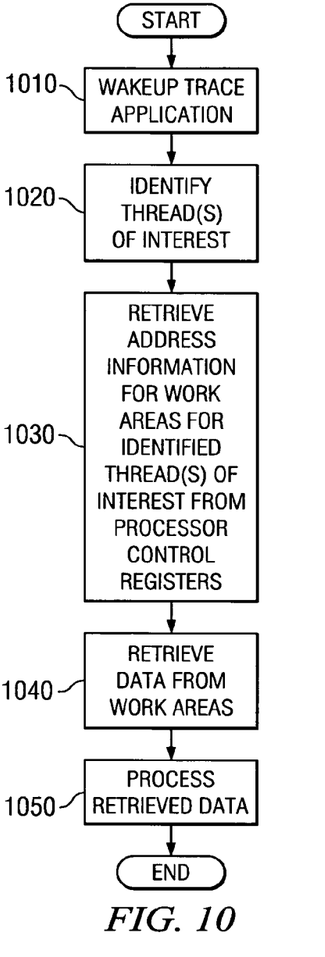
FIG. 10 is a flowchart outlining an exemplary operation for processing thread tracking information stored in the thread work areas in accordance with an exemplary embodiment of the present invention.

FIG. 8 is a flowchart outlining an exemplary operation for initiating hardware thread tracking in accordance with an exemplary embodiment of the present invention. FIG. 9 is a flowchart outlining an exemplary operation for writing thread tracking information to a thread work area in accordance with an exemplary embodiment of the present invention. FIG. 10 is a flowchart outlining an exemplary operation for processing thread tracking information stored in the thread work areas in accordance with an exemplary embodiment of the present invention.

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 8, the operation for initiating hardware thread tracking starts by initiating the trace of code execution (step 810). The control bit for storing thread tracking information is then set (step 820) and the operating system is informed of the size of the work areas for the threads (step 830). The operating system then allocates the work areas for the existing threads based on the size (step 840) and sets the control registers to point to the beginning address and to store the length of each work area (step 850). The operation then terminates.

Referring now to FIG. 9, the operation for writing thread tracking information to a thread work area starts by the processor microcode detecting the processing of a call/return instruction or operation (step 910). A determination is made as to whether the instruction is a call instruction (step 915). If the instruction is a call instruction, a determination is made as to whether the call is from a new thread (step 920). If the call is not from a new thread, a determination is made as to whether the writing of an entry to the work area for the existing thread would result in a work area overflow (step 930). If so, an interrupt is sent to the operating system or monitoring application, e.g., trace application, to extend the work area (step 935). The work area is then extended and the control registers are reset to point to the new beginning address and length for the extended work area (step 940).

If the call is from a new thread, a new work area in memory is allocated for the new thread and control registers are set to point to the beginning address and length of the new work area for the new thread (step 950). Thereafter, after extending the work area (step 940), or if the writing of the entry to the existing work area would not result in a work area overflow (step 930), the entry for the call is written to the call stack in the work area for the thread (step 960).

Returning to step 915, if the instruction is a return instruction, the current thread work area is identified from the control registers (step 965). The last entry in the call stack in the current thread work area is then popped off the call stack (step 970). The operation then terminates.

With reference now to FIG. 10, the operation for processing thread tracking information stored in the thread work areas starts by having a wakeup of the trace application (step 1010). The threads of interest are then identified (step 1020). The threads of interest are implementation specific and may include, for example, only the currently executing threads, the threads that have been placed in a suspended state, all of the threads whether currently executing or not, and the like. It is assumed that the trace application will be aware of which threads are of interest.

The address information for the work areas for the threads of interest is retrieved based on the information stored in the control registers (step 1030). The data in these work areas may then be retrieved from the work areas in memory (step 1040) and processed (step 1050). The operation then terminates.

It should be noted that while the present invention has been described above with regard to the processor automatically detecting call and return instructions based on the type of instruction that is processed by the processor, the present invention is not limited to such. Rather, instructions may be specifically instrumented, such as by the compiler, to include the setting of flag bits to identify the instruction as one that is to be treated as a call or a return instruction. For example, there are instances, such as when there is a branch instruction to a routine, where a routine may be entered or exited without the routine being explicitly "called" by a "call" instruction or exited by a "return" instruction. In such cases, the mechanisms of the present invention may allow the branch instruction or other type of instruction that enters or exits a routine without performing an explicit "call" or "return" to be flagged as one that is to be treated as either a call instruction or a return instruction.

For example, instruction metadata may be associated with an instruction that is read by the processor when the processor retrieves the instruction for execution. The processor may investigate the setting of a call flag bit and a return flag bit to determine if the particular instruction is to be treated as either a call or a return even though the instruction itself is not a call or a return instruction. If the call flag bit is set for the instruction, the above described thread stack processing is performed in a similar manner as if the instruction was an explicit "call" instruction. If the return flag bit is set for the instruction, the above described thread stack processing is performed in a similar manner as if the instruction was an explicit "return" instruction. In this way, instructions that effectively perform a similar function to a call or a return but are not explicit call or return instructions are still treated in the same manner with regard to thread stack processing as explicit call and return instructions.

Thus, the present invention takes advantage of the fact that the processor knows when it is entering and exiting methods/routines by virtue of the instructions that are being executed by the processor. With the present invention, rather than having a software program monitor the execution of a computer program to determine when methods/routines are entered/exited and writing the information to a software maintained call stack, the present invention enables the processor hardware to automatically write the necessary information to a thread work area. In this way, the maintaining of a thread stack is performed independently of the software tracing algorithms. As a result, changes in the software for tracking the execution of a computer program will not affect the mechanisms used to maintain the thread call stack. Furthermore, the computer program under trace need not be instrumented to maintain thread call stack information since this information is stored automatically by the processor into the allocated work areas for the threads.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, instead of using a field in an instruction or in a bundle, a new instruction or operation code may be used to indicate that a subsequent instruction, or a subsequent set of instructions are marked instructions. Also, the architecture of a processor may be changed to include additional bits if spare fields for performance indicators are unavailable in the case in which it is desirable to include performance indicators within fields in the instructions. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for storing thread tracking information during execution of a computer program, comprising:

setting a thread tracking control bit in a processor of the data processing system to enable thread tracking by the processor; and responsive to setting the thread tracking control bit in the processor:

allocating a work area for a thread of the computer program, wherein the work area is used to store thread tracking information for the thread, and wherein the thread tracking information is a thread call stack;

automatically determining, within microcode of the processor, if an event has occurred requiring modification of the thread tracking information in the work area; and responsive to the microcode automatically determining that an event has occurred requiring modification of the thread tracking information in the work area, modifying the thread tracking information in the work area, wherein modifying the thread tracking information includes at least one of adding an entry to the thread call stack and popping off an entry from the thread call stack, and wherein the method further comprises:

determining if modifying the thread tracking information will cause an overflow of the work area; and responsive to determining that modifying the thread tracking information will cause an overflow of the work area, extending the work area, wherein extending the work area includes:

allocating a new area of memory for storage of the thread tracking information;

storing a beginning address and a length of the new area in control registers of the processor; and copying existing thread tracking information from the work area to the new area of memory.

2. The method of claim 1, wherein:

allocating a work area for a thread of the computer program comprises:

setting a first control register in the processor to point to a beginning address for the work area and setting a second control register in the processor to identify a length of the work area.

3. The method of claim 1, further comprising:

identifying a spawning of a new thread during execution of the computer program, wherein allocating a work area for a thread of the computer program comprises:

allocating the work area for the new thread in response to the spawning of the new thread.

4. The method of claim 1, further comprising: receiving an identification of a size of the work area from a trace application running on the data processing system.

5. The method of claim 1, wherein allocating a work area for a thread of the computer program comprises allocating a work area for a thread of a computer program by an operating system running on the data processing system in response to a spawning of a thread during execution of the computer program.

6. The method of claim 1, wherein the event is one of an entry into a method/routine and exit from a method/routine.

7. An apparatus for storing thread tracking information during execution of a computer program, comprising:

a processor having microcode;

a control bit register of the processor for setting a thread tracking control bit to enable thread tracking by the processor; and a memory coupled to the processor, wherein the processor executes instructions of a computer program under trace by a trace application and, responsive to setting the thread tracking control bit allocates a work area for a thread of the computer program in the memory, the work area being used to store thread tracking information for the thread, wherein the thread tracking information is a thread call stack, and wherein the microcode of the processor automatically determines if an event has occurred requiring modification of the thread tracking information in the work area and, responsive to determining that an event has occurred requiring modification of the thread tracking information in the work area, modifies the thread tracking information in the work area, wherein the microcode of processor modifies the thread tracking information by at least one of adding an entry to the thread call stack and popping off an entry from the thread call stack, and wherein the microcode of the processor further determines if modifying the thread tracking information will cause an overflow of the work area, sends an interrupt to an interrupt handler of the trace application, and wherein the interrupt handler extends the work area in response to receiving the interrupt by allocating a new work area of the memory for storage of the thread tracking information, stores a beginning address and a length of the new area in control registers of the processor, and copies existing thread tracking information from the work area to the new area of the memory.

8. The apparatus of claim 7, wherein the processor includes a first control register and a second control register and wherein the first control register is set to point to a beginning address for the work area and the second control register is set to identify a length of the work area.

9. The apparatus of claim 7, wherein the processor allocates the work area for the thread in response to detecting a new thread being spawned.

10. The apparatus of claim 7, wherein a size of the work area is set by the trace application.

11. The apparatus of claim 7, wherein the work area is allocated by an operating system running on the processor in response to a spawning of a thread during execution of the computer program.

12. The apparatus of claim 7, wherein the event is one of an entry into a method/routine and exit from a method/routine.

13. A computer program product comprising a computer storage medium having program code for storing thread tracking information during execution of a computer program, the computer program product comprising:

a first instructions for setting a thread tracking control bit in a processor of the data processing system to enable thread tracking by the processor; and responsive to setting the thread tracking control bit in the processor:

second instructions for allocating a work area for a thread of the computer program, wherein the work area is used to store thread tracking information for the thread, and wherein the thread tracking information is a thread call stack;

third instructions for automatically determining, within microcode of the processor, if an event has occurred requiring modification of the thread tracking information in the work area;

fourth instructions, responsive to the microcode automatically determining that an event has occurred requiring modification of the thread tracking information in the work area, for modifying the thread tracking information in the work area, wherein the fourth instructions for modifying the thread tracking information includes at least one of instructions for adding an entry to the thread call stack and instructions for popping off an entry from the thread call stack;

fifth instructions for determining if modifying the thread tracking information will cause an overflow of the work area; and responsive to determining that modifying the thread tracking information will cause an overflow of the work area, sixth instructions for extending the work area, wherein the sixth instructions for extending the work area includes:

instructions for allocating a new area of memory for storage of the thread tracking information;

instructions for storing a beginning address and a length of the new area in control registers of the processor; and instructions for copying existing thread tracking information from the work area to the new area of memory.

\* \* \* \* \*